United States Patent [19]

Flanagan, Sr. et al.

[11] Patent Number: 5,152,348

[45] Date of Patent: Oct. 6, 1992

[54] TURF AERATING MACHINE AND TOOL ATTACHMENT

[76] Inventors: Robert P. Flanagan, Sr., 524 Sixth St.; Robert P. Flanagan, Jr., P.O. Box 601, both of Dover, N.H. 03820

[21] Appl. No.: 740,701

[22] Filed: Aug. 5, 1991

[51] Int. Cl.$^5$ .................... A01B 45/00; A01C 5/04
[52] U.S. Cl. ..................... 172/21; 172/607; 111/99
[58] Field of Search ............. 172/21, 22, 101, 116, 172/607, 606; 111/89, 99

[56] References Cited

U.S. PATENT DOCUMENTS

| | | | |
|---|---|---|---|
| 1,183,653 | 5/1916 | Kring | 111/99 |
| 1,965,177 | 7/1934 | Finkl | 172/21 |
| 3,168,150 | 2/1965 | Kappler | 172/371 |
| 3,180,427 | 4/1965 | Leeper, Jr. | 172/21 |
| 3,429,378 | 2/1969 | Mascaro | 172/22 |
| 3,586,109 | 6/1971 | Eversole | 172/22 |
| 3,621,920 | 11/1971 | Brown | 172/21 |
| 3,926,131 | 12/1975 | Collins | 172/21 X |
| 4,034,686 | 7/1977 | Collins | 111/89 X |
| 4,566,543 | 1/1986 | Kotani | 172/21 X |
| 4,791,995 | 12/1988 | Hochlan, Jr. | 172/21 |

FOREIGN PATENT DOCUMENTS

| | | | |
|---|---|---|---|
| 856537 | 12/1960 | United Kingdom | 172/22 |
| 2213692 | 8/1989 | United Kingdom | 172/22 |

Primary Examiner—Dennis L. Taylor
Assistant Examiner—Jeffrey L. Thompson
Attorney, Agent, or Firm—Daniel H. Kane

[57] ABSTRACT

A turf spiking tool attachment 10 retrofits turf aerating machines 20 having reciprocating pistons 20 with the turf spiking tool attachments 10 mounted on the free ends of the pistons 20 for motor driven punching and aerification of turf. A flat base plate or punch plate 11 is secured to the free end of a piston. A plurality of spiking tines 13 project from the base plate 11. A stripper plate 12 is formed with a plurality of openings 18 in alignment with the projecting tines 13 of the base plate. The stripper plate 12 is mounted adjacent to the base plate 11 for sliding motion relative to the base plate. Guide elements 15,16 maintain the stripper plate and base plate substantially in parallel alignment. The stripper plate 12 bears against the turf. A stripper spring 17 pushes the stripper plate against the turf, holds the turf in place during retraction of the tines 13, and returns the stripper plate 12 to a starting position. The stripper plate 12 is formed with upper and lower surfaces at a bevel angle 12a substantially equal to the drive angle 20a of the pistons 20 relative to a vertical axis 22 so that the lower surface of the stripper plate 12 is parallel with the ground. The guide elements 16,15 provide sufficient clearance for limited compound rocking motion of the stripper plate 12. The stripper spring 17 is seated in recesses for full sliding motion and closing of the stripper plate 12 and the base plate 11 during reciprocating cycles of punching and aerification of turf.

20 Claims, 3 Drawing Sheets

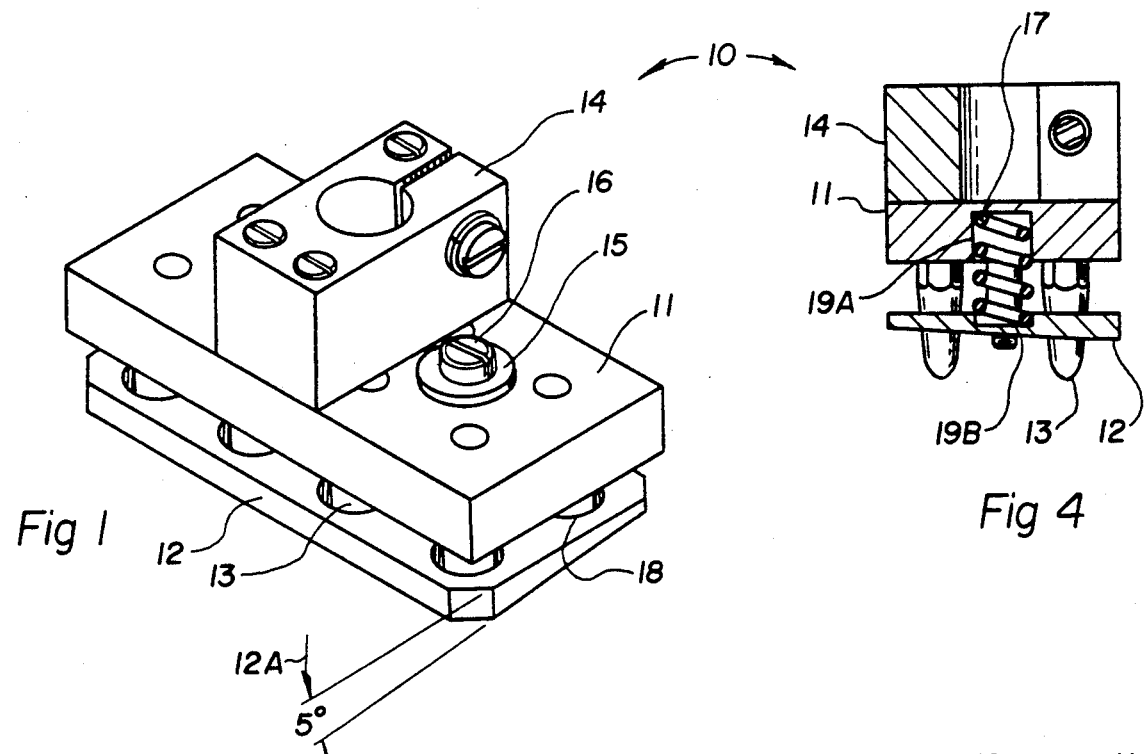
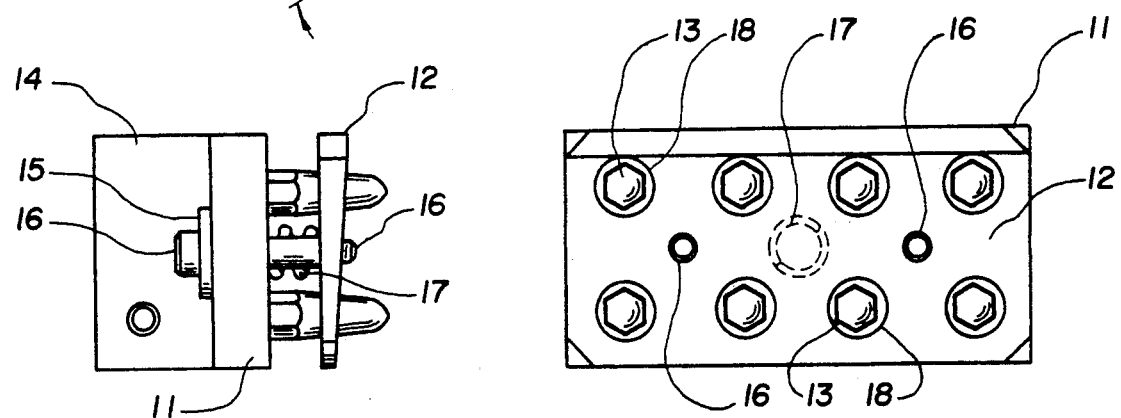
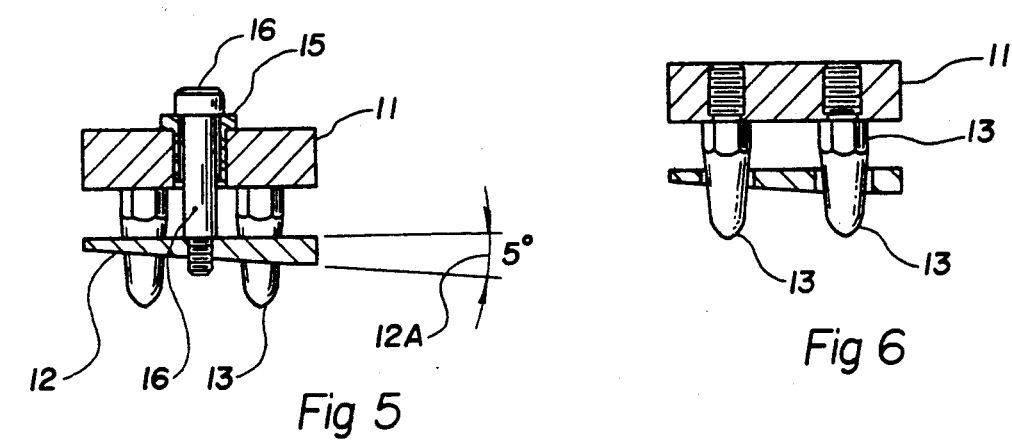

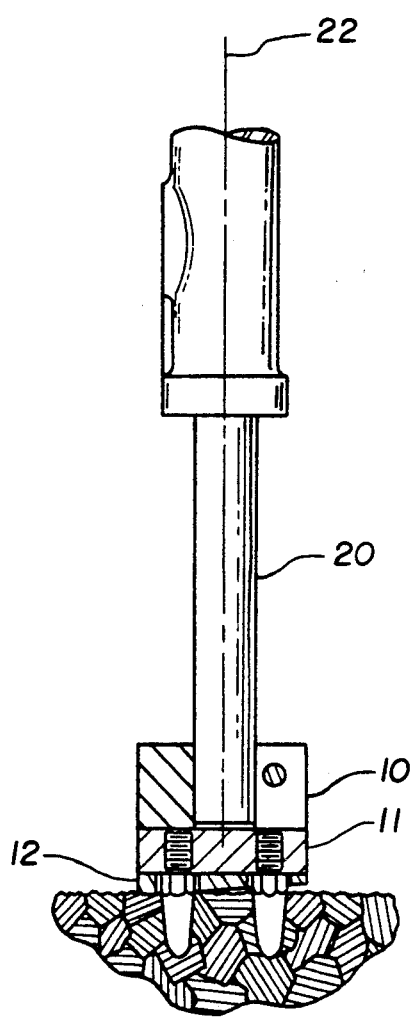
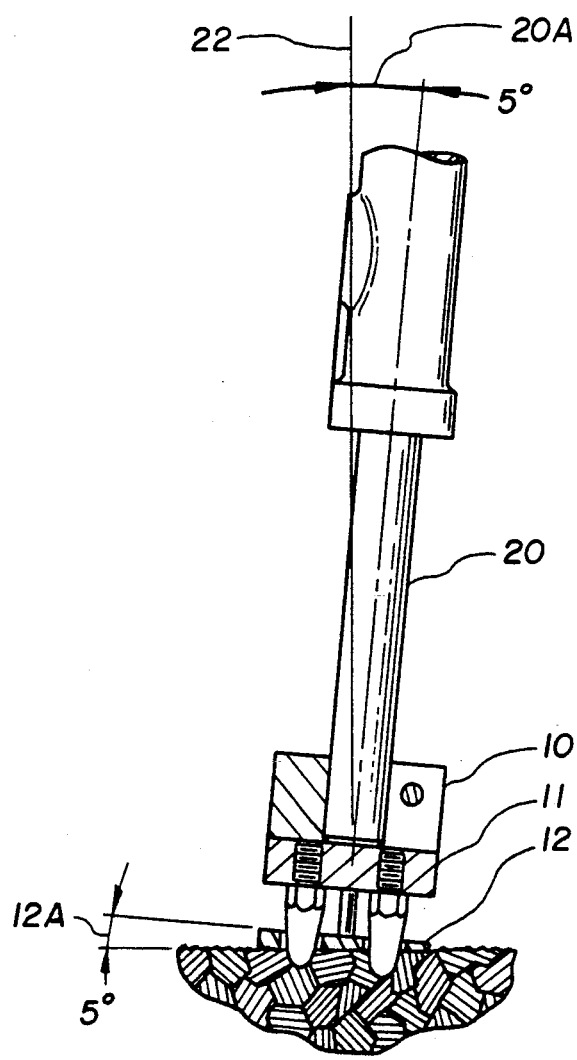
Fig 7          Fig 8
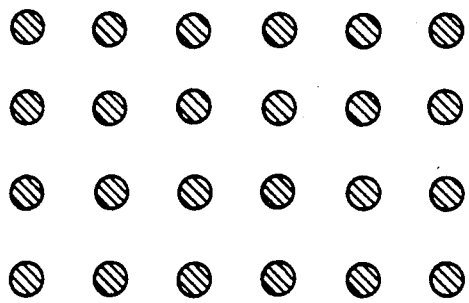
Fig 9

TURF AERATING MACHINE AND TOOL ATTACHMENT

TECHNICAL FIELD

This invention relates to turf aerification equipment for motor driven punching and aerification of turf. In particular the invention relates to an improved turf aerating machine of the type with motor driven reciprocating pistons and to a new turf spiking tool attachment for the pistons. The invention is used for surface preparation of golf greens, lawns and turf generally for selective reseeding and overseeding. The invention provides high density parting and penetration of turf to soil underlying the turf for good soil contact.

BACKGROUND ART

Aerification of turf by turf spiking rather than turf coring, in preparation for selective reseeding or "overseeding", affords several advantages. First, "punching" the turf with spiking tines or spikes rather than coring tines can be used to part the turf and penetrate to soil underlying the turf without leaving small cores of soil and turf lying on the deck. On golf greens, for example, the surface remains available for use without further surface dressing. Second, the spike holes formed in the turf tend to reclose and resume the original surface configuration after reseeding following additional use or rolling of the reseeded area. Finally, seeding of additional plants for turf restoration is accomplished without removing other plants already there.

Successful and satisfactory integration of turf spiking tools and attachments into automated and motor driven turf aerification equipment has, however, not been achieved. The use of turf parting and penetrating spiking tines in turf aerating machines generally results in "divoting" pullup of patches of turf from the underlying soil. As the tines penetrate the turf, the tapered tines tend to "grab" the turf, pulling it out upon retraction of the tines. To avoid this, existing automated and motor driven turf aerators based upon turf punching with spiking tines must use tines arranged at low density with relatively wide spacing between tines in order to avoid turf pullup. As a result there is also low density soil contact seeding, unsatisfactory for high density reseeding and overseeding requirements.

Manual surface preparation tools have been developed to prevent the problem of turf divoting . . . Four United States Patents directed to hand cultivators or "manual tillers" for lawn conditioning were found in a search. The earliest patent reference appears to be the Finkl U.S. Pat. No. 1,965,177 issued in 1934 for a Lawn Cultivating Tool. Finkl discloses the basic concept of a hand tool with "two superimposed plates", a base plate with vertical spikes, and a yieldable plate with apertures aligned with the spikes. The base plate and yieldable plate are held in "parallel spaced relation" by guide rods with coil springs. The plates are mounted at the end of a long handle for manual operation. As explained by Finkl, "during withdrawal of the tool any dirt which might otherwise adhere to the sides of the spikes will be cleared therefrom by the yielding plate . . . ".

Subsequent patents describe variations on this basic turf spiking tool. The Leeper U.S. Pat. No. 3,180,427 adds a locking mechanism for converting the aerating tool to a "tamper" tool. The locking mechanism prevents relative vertical motion of the plates for use in tamping. Leeper also suggests at the end of the specification that "The soil tamping and aerating devices above described may be employed either manually, namely by means of their operating handles . . . , or may be mechanically operated by any suitable reciprocating drive means connected in place of the operating handle." Column 4, Lines 44-48.

The Hochlan U.S. Pat. No. 4,791,995 issued in 1988 describes a similar "manual tiller" and adds the feature of diamond shaped heads on the tines or spikes. In U.S. Pat. No. 3,168,150, Kappler adds the feature of converging or pivotal motion of the tines/fingers in addition to vertical penetration, for correcting depressions or indentations in the golf green. The slight converging motion of the tines upon penetration pushes soil upwardly into a depression to be filled.

Representative patents on the automated turf aerating and cultivating machines include the Collins U.S. Pat. Nos. 4,034,686 and 3,926,131. Collins describes dual tong liquid injector units for injecting liquid treatment material under high pressure into the soil. Six of the injector units are retrofitted on the six vertically reciprocating pistons of a RYAN WG24-1 (Trademark) Turf Aerator. The Collins patents are not directed to turf tools and do not address the problem of turf divoting.

The Eversole U.S. Pat. No. 3,586,109 is directed to a coring "tine" or tool for use on golf green aerators. A comblike element carried by the machine frame is adapted for resting on the ground adjacent the tines and prevents the turf from being lifted when the blocks and the tines move vertically upward. According to this approach for preventing turf pullup or "divoting", the comblike element is connected to the machine frame rather than the tool.

The Kotani U.S. Pat. No. 4,566,543 describes an aerator with a mechanism for controlled depth spiking by a single spike for injecting compressed air into the ground.

The Brown U.S. Pat. No. 3,621,920 describes an automated electric motor lawn aerating machine showing spring loaded shoe stops which bear against the ground during penetration of the low density spiker rod elements Spring bias on the shoe elements helps in removal of the "spiker bits" from the soil. The spring loaded shoe stops however do not form a full ground covering plate parallel with the base plate of the aerating spikes.

Despite the suggestion of Leeper, "manual tillers" of the type described by Finkl but with high density spikes have not been successfully incorporated into automated or motor driven turf aerators of the type described by Collins. The present inventor has discovered that this is the consequence of at least several non-obvious problems encountered in automation of high density turf spiking and in attempts at integration of turf spiking tools into turf aerating machines of the type with motor driven reciprocating pistons. The present invention first recognized these problems and provided nonobvious solutions.

OBJECTS OF THE INVENTION

It is therefore an object of the present invention to provide a new turf aerification machine for motor driven punching and aerification of turf by high density turf spiking without divoting and pullup of patches of turf. The invention is intended to provide high density spiking into the soil underlying the turf for reseeding and overseeding with good soil contact.

Another object of the invention is to provide a new turf spiking tool attachment for retrofitting turf aerators of the type with motor driven reciprocating pistons. The invention is intended to achieve successful integration of high density turf spiking tools into automated turf aerification equipment.

A further object of the invention is to resolve the problems in integrating turf spiking tools with motorized turf aerators first recognized by the present invention.

DISCLOSURE OF THE INVENTION

In order to accomplish these results the present invention provides a turf aerating machine having a plurality of reciprocating pistons each with a driving end and a free end. A turf aerating tool in the form of a turf spiking tool according to the invention is mounted on the free end. The pistons are oriented for motor driven punching and aerification of turf in reciprocating cycles of the turf spiking tools during motion of the turf aerating machine in a forward direction of travel.

It is an observation and feature of the present invention that the pistons of typical turf aerating machines are oriented at a drive angle with respect to the vertical direction or vertical axis. That is, the driving end of each piston is tilted slightly forward of the free end of the piston in the forward direction of travel of the turf aerating machine thereby forming the drive angle during at least a portion of each reciprocating cycle when the tool impacts the ground to facilitate motion in the forward direction of travel.

According to the invention the improved turf spiking tool or tool attachment is formed with a flat base plate with mounting means such as a mounting yoke for securing the base plate to the free end of a piston. A plurality of spiking tines projects from the base plate. The tines are formed with tapered ends and with sufficient length to penetrate turf and make soil contact with soil underlying the turf.

A stripper plate is formed with a plurality of openings in alignment with the projecting tines of the base plate. The stripper plate is mounted and positioned adjacent to the base plate for sliding motion relative to the base plate, with the tines of the base plate passing through the stripper plate openings. The stripper plate is also formed with guide elements such as guide bolts secured to the stripper plate and engaging the adjacent base plate. The guide elements maintain the stripper plate and base plate substantially in parallel alignment during relative sliding motion. The stripper plate is positioned below the base plate for bearing against the turf during punching and aerification of turf.

A stripper spring is coupled between the base plate and the stripper plate with a selected spring constant for pushing the stripper plate against the turf and for holding down the turf. The stripper spring returns the stripper plate to a spaced apart starting position relative to the base plate after punching and aerification of turf.

According to a first feature of the invention the stripper plate is formed with upper and lower surfaces at a bevel angle relative to each other. The stripper plate is mounted adjacent to the base plate with the upper surface of the stripper plate substantially in parallel with a lower surface of the base plate. The bevel angle of the stripper plate is selected to be substantially equal to the drive angle of the respective piston. As a result the lower surface of the stripper plate contacting the turf is substantially parallel with the ground.

According to a second feature of the invention the guide elements are provided by at least two spaced apart guide bolts secured to the stripper plate and projecting in the direction of the adjacent base plate. The base plate is formed with guide holes slideably receiving the stripper plate guide bolts for maintaining the stripper plate and base plate substantially in parallel alignment without interference in the punching and aerification of turf. In the preferred embodiment each guide hole is formed with a bushing for slideably receiving the respective guide bolt.

Importantly, the base plate guide hole bushings and respective stripper plate guide bolts are constructed with sufficient tolerance or clearance to accommodate limited compound angular rocking motion of the stripper plate relative to the base plate. This clearance for limited compound angular rocking motion is essential during contact of the stripper plate with turf while punching and aerating the turf in reciprocating cycles and while the turf aerating machine is in motion in the forward direction of travel. The limited compound angular rocking motion according to this second feature of the invention prevents undue stresses on the piston seals preventing premature failure and prolonging piston life. Preferably the guide hole bushings and guide bolts are constructed with sufficient tolerance to accommodate departure from parallel alignment of the stripper plate and base plate in the angular range of approximately 3° to 5° relative to each other.

According to a third feature of the invention, the base plate is formed with a first stripper spring recess. The stripper spring is seated in the first recess at one end while abutting the stripper plate at a second end. The stripper spring recess permits close approach of the stripper plate and base plate without interference by the stripper spring. In the preferred example the stripper plate is formed with a second stripper spring recess further accommodating the stripper spring at its second end. Preferably, the combined depth of the recesses is slightly less than the compressed length of the stripper spring. Unlike previous turf spiking tools, the stripper plate may therefore approach and actually contact the base plate without interference by the stripper spring.

These three features of the invention in particular achieve successful integration of the turf spiking tool attachment into turf aerators with reciprocating pistons for motor driven punching and aerification of turf. The bevel angle stripper plate achieves flat bearing against the turf; the guide element clearance for limited compound angular rocking motion of the stripper plate relative to the base plate further maintains flat contact while the turf aerating machine moves in the forward direction of travel; and the recessed stripper spring permits full sliding motion and closing of the stripper plate relative to the base plate. All features coact to achieve successful high density spiking aeration and surface preparation for overseeding.

Other objects, features and advantages of the invention are apparent in the following specification and accompanying drawings.

BRIEF DESCRIPTION OF THE DRAWINGS

FIG. 1 is a perspective view of the turf spiking tool attachment with the mounting yoke secured to the base plate.

FIG. 2 is a plan from the bottom of the turf spiking tool attachment revealing tines visible through aligned openings in the stripper plate.

FIG. 3 is a side elevation view of the turf spiking tool attachment of FIG. 1.

FIG. 4 is a side cross section view of the turf spiking tool attachment of FIG. 1 with the cross section taken at the center of the turf spiking tool attachment revealing the stripper spring.

FIG. 5 is a side cross section view through the turf spiking tool attachment of FIG. 1 with the cross section taken at a guide bolt and guide hole bushing.

FIG. 6 is a side cross section view of the turf spiking tool attachment of FIG. 1 with the cross section taken at a pair of spiking tines.

FIG. 7 is a diagrammatic side view in partial cross section of the turf spiking tool attachment mounted at the free end of a piston and with the piston oriented in the vertical direction along a vertical axis.

FIG. 8 is a diagrammatic side view in partial cross section of the turf spiking tool attachment secured to the free end of a piston and with the piston oriented at a drive angle of approximately 5° with respect to the vertical direction according to a typical turf aerator.

FIG. 9 is a plan view of a section of turf showing the turf punching and aerification pattern developed by three reciprocating cycles of a single turf spiking tool.

DESCRIPTION OF PREFERRED EXAMPLE EMBODIMENTS AND BEST MODE OF THE INVENTION

Figure 10:
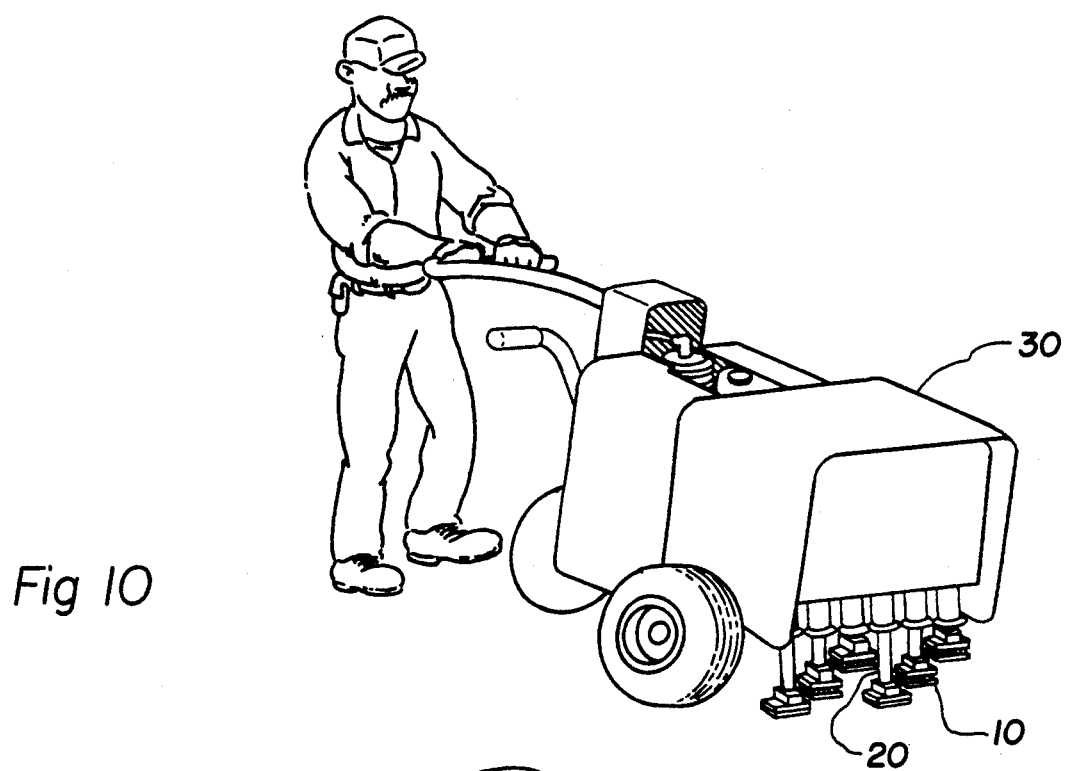
FIG. 10 is a diagrammatic perspective view of a turf aerating machine showing the reciprocating pistons at a specified drive angle with the turf spiking tool attachments mounted at the free ends of the pistons.

The turf spiking tool attachment 10 for retrofitting motor driven pistons of a turf aerator is illustrated in FIGS. 1-6. A tine base plate or punch plate 11 is provided with an array of eight spiking tines 13 tapered at the ends. A mounting yoke 14 is secured to the punch plate 11 for mounting on the free end of a reciprocating piston as hereafter described.

The stripper plate 12 is formed with openings 18 aligned with the tines 13 of the punch plate 11 for sliding over the tines 13. The stripper plate 12 is mounted and positioned adjacent to the base plate 11 for sliding motion relative to the base plate 11. The starting position of the stripper plate 12 is approximately half way along the length of the tines 13.

The stripper plate 12 is formed with two spaced apart guide bolts 16 which are secured to the stripper plate by, for example, Locktite (Trademark) compound. The guidebolts 16 project from the stripper plate 12 in the direction of the adjacent base plate 16. The base plate 11 is formed with a pair of spaced apart guide holes fitted with guide bushings 15 for slideably receiving the respective stripper plate guide bolts 16.

The stripper plate 12 is positioned below the punch plate 11 for initially bearing against the turf or ground. As the tines 13 penetrate the turf as hereafter described, the stripper plate 12 and punch plate 11 slide and close relative to each other while the guide bolts 16 sliding within the bushings 15 maintain the stripper plate and base plate substantially in parallel alignment.

The stripper plate 12 is spring loaded relative to the base plate 11 by a stiff stripper spring 17. Stripper spring 17 is coupled between the base plate 11 and stripper plate 12. The stiff spring constant selected for stripper spring 17 restores the stripper plate 12 to the spaced apart starting position relative to base plate 11 after each reciprocating cycle of punching and aerating the turf. Stripper spring 17 also holds the turf in place under the stripper plate 12 upon retraction of the punch plate 11 and tines 13 from the turf during a reciprocating cycle.

Considering the features of the turf spiking tool attachment in further detail, the stripper plate 12 is formed with upper and lower surfaces at a bevel angle relative to each other resulting in a wedge shaped stripper plate. As shown, for example, in FIGS. 4 and 5, the stripper plate 12 is mounted with the upper surface of the stripper plate substantially parallel with a lower surface of the base plate 11. Furthermore, the bevel angle 12a of the stripper plate 12 is selected to be substantially equal to the drive angle of the piston on which the turf spiking tool is mounted as hereafter described with reference to FIG. 7 and 8. In the example of FIGS. 1-6, the bevel angle is selected to be approximately 5° and more generally within the typical range of drive angles of turf aerator machines of approximately 5° to 10°.

Figure 11:
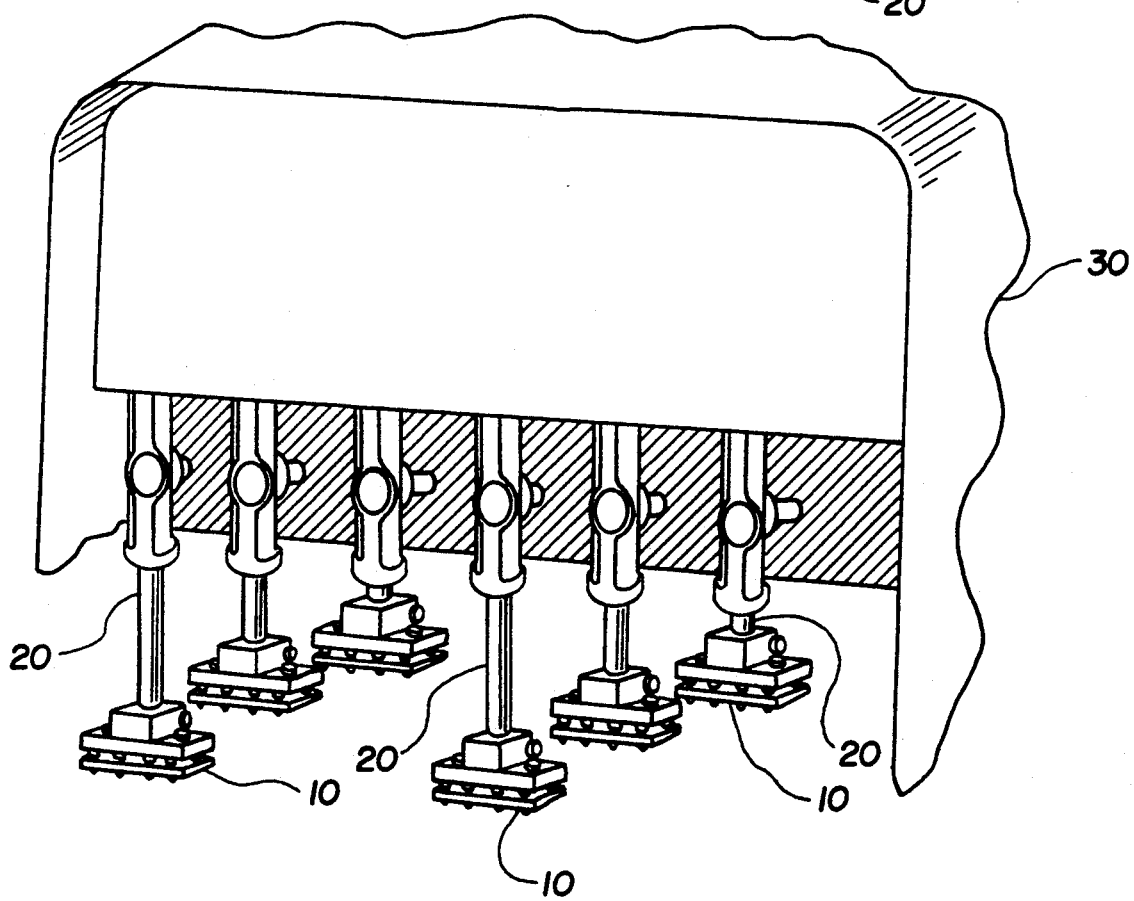
FIG. 11 is a detailed fragmentary perspective view of the reciprocating pistons of the turf aerating tool showing the respective turf spiking tool attachments mounted on the free ends of the respective pistons.

Referring to FIG. 7 and 8, the turf spiking tool attachment 10 is mounted on the piston 20 of a turf aerator machine 30 of the type, for example illustrated in FIGS. 10 and 11. It is observed that the orientation or drive angle of the piston 20 is typically not in the vertical direction of the vertical axis 22 as illustrated in FIG. 7. Rather the piston 20 is typically oriented at a drive angle 20a of, for example 5° from the vertical direction or vertical axis 22. By selecting a bevel angle 12a for the stripper plate 12 substantially equal to the drive angle 20a of piston 20, the lower surface of stripper plate 12 lies flat on the ground for bearing against the turf with substantially equal distribution of pressure across the stripper plate 12.

Furthermore, the guide bushings 15 press fit into the base plate 11 and the guide bolts 16 secured to stripper plate 12 are constructed with sufficient tolerance or clearance to permit limited compound angular rocking motion of the stripper plate 12 relative to the base plate 11. The rocking motion permitted by the selected clearance departs from parallel alignment of the base plate and stripper plate in the angular range of approximately 3° to 5° relative to each other in either the length or width directions.

Referring to FIGS. 10 and 11, this limited compound angular rocking motion achieves and maintains flat contact of the stripper plate 12 with the turf during the punching and aerification of turf in reciprocating cycles and while the turf aerating machine 30 is in motion in the forward travel direction. In the example of FIGS. 10 and 11, the turf aerator includes six motor driven reciprocating pistons 20 each fitted with a turf spiking tool attachment 10 at the free end of the piston 20. Each piston 20 in respective turf spiking tool 10 reciprocates through punching and withdrawing cycles in a timed coordination with the other pistons and respective turf spiking tools. Each tool develops a successive pattern of penetrating spike holes as illustrated in FIG. 9. While each turf spiking tool 10 is in contact with the ground the compound angular rocking motion or play permitted by the guide element clearances in the tool maintains flat contact of the stripper plate 12 with the turf without excessive stresses on the piston seals. Because of the great forces involved regular replacement and repair is otherwise required.

A typical turf aerator with motor driven reciprocating pistons for use in the present invention is, for example, the Ryan GREENSAIRE 24 (Trademark) Model Turf Aerification Machine manufactured by Cushman, Inc., 900 N. 21st St., P.O. Box 82409, Lincoln, Nebraska 68501. For this machine the drive angle is approximately 5° and the bevel angle of the stripper plate on the retrofitting spiking tool attachment is therefore also selected to be 5°.

The base plate 11 is formed with a first recess 19a in which the stripper spring 17 is seated. The first stripper spring recess 19a is formed with a depth of, for example between one third and one half the length of the stripper spring 17. A second shallower recess 19b is formed in stripper plate 12 for receiving the other end of the stripper spring 17. The stripper spring recesses 19a and 19b accommodate the compressed length of stripper spring 17 so that stripper plate 12 is able to approach and contact the punch plate 11 during turf punching and aerification. the full available length of the spiker tines 13 less the thickness of stripper plate 12 is therefore available for parting and penetrating the turf and underlying soil.

The length of the respective tines or spikes 13 is selected to give the desired parting and penetration through the overlying turf and into the soil underlying the turf for good soil contact by seeds falling into the spike holes. To this end, the typical length of the tines 13 might be for example in the range of approximately ¾ inch (1.9cm) to 1 ¼ inches (3.1cm) where the thickness of the stripper plate 12 tapers from, for example ¼ inch (0.6cm) to ⅛ inch (0.3cm). In the illustrated examples, each tool is provided with eight tines or spikes at a relative high density with spacing between the tines of approximately 1 inch (2.5cm) on center or less. Thus, as used herein high density spiking or high density spikes refers to punching with spikes spaced approximately 1 inch (2.5cm) on center or less.

While the invention is described with reference to particular example embodiments it is intended to cover all modifications and equivalents within the scope of the following claims.

We claim:

1. A turf aerating machine having a plurality of reciprocating pistons each with a driving end and a free end, a turf aerating tool being mounted on the free end, said pistons being oriented for motor driven punching and aerification of turf in reciprocating cycles of the turf aerating tools during motion of the turf aerating machine in a forward direction of travel, said pistons being oriented at a drive angle with respect to a vertical direction, the driving end of each piston being tilted slightly forward of the free end of the piston in the forward direction of travel of the turf aerating machine thereby forming said drive angle during at least a portion of each reciprocating cycle to facilitate motion in the forward direction of travel, the improvement in which each turf aerating tool is a turf spiking tool comprising:
a flat base plate with mounting means for securing the base plate to the free end of a piston, and a plurality of spiking tines projecting from the base plate, said tines having tapered ends and a length sufficient to penetrate turf and make soil contact with soil underlying the turf;
a stripper plate formed with a plurality of openings in alignment with the projecting tines of the base plate, said stripper plate being mounted and positioned adjacent to the base plate for sliding motion relative to the base plate with the tines of the base plate passing through the stripper plate openings, said stripper plate also being formed with guide means secured to the stripper plate and engaging the adjacent base plate for maintaining the stripper plate and base plate substantially in parallel alignment, said stripper plate being positioned for bearing against the turf during punching and aerification of turf;
stripper spring means coupled between the base plate and stripper plate having a selected spring constant for pushing the stripper plate against the turf and for returning the stripper plate to a spaced apart starting position relative to the base plate after punching and aerification of turf;
said stripper plate being formed with upper and lower surfaces at a bevel angle relative to each other, said stripper plate being mounted adjacent to the base plate with the upper surface of the stripper plate being substantially parallel with a lower surface of the respective base plate, said bevel angle of the stripper plate being substantially equal to the drive angle of the pistons so that the lower surface of the stripper plate contacting the turf is substantially parallel with the ground.

2. The turf aerating machine of claim 1 wherein the guide means comprises at least two spaced apart guide bolts secured to the stripper plate and projecting in the direction of the adjacent base plate, said base plate being formed with guide holes slideably receiving the stripper plate guide bolts for maintaining the stripper plate and base plate substantially in parallel alignment without interference in punching and aerification of turf.

3. The turf aerating machine of claim 2 wherein each guide hole is formed with a bushing for slideably receiving a respective guide bolt of the stripper plate, said base plate guide hole bushings and respective stripper plate guide bolts being constructed with specified tolerance or clearance to accommodate limited compound angular rocking motion of the stripper plate relative to the base plate during contact of the stripper plate with turf while punching and aerating the turf in reciprocating cycles and while the turf aerating machine is in motion in the forward direction of travel.

4. The turf aerating machine of claim 3 wherein the base plate guide hole bushings and respective stripper plate guide bolts are constructed with specified tolerance to accommodate compound angular rocking motion of the stripper plate relative to the base plate departing from parallel alignment in the angular range of approximately 3° to 5° relative to each other.

5. The turf aerating machine of claim 1 wherein the base plate is formed with a first stripper spring recess, said stripper spring means being seated in said recess at a first end and abutting the stripper plate at a second end, thereby permitting close approach of the stripper plate and base plate without interference by the stripper spring means.

6. The turf aerating machine of claim 5 wherein the stripper plate is formed with a second stripper spring recess, said stripper spring means being seated in said second stripper spring recess at the second end; said first and second recesses providing a combined depth slightly less than the compressed length of the stripper spring.

7. The turf aerating machine of claim 1 wherein the bevel angle between the upper and lower surfaces of the stripper plate is in the range of approximately 5° to 10°.

8. The turf aerating machine of claim 1 wherein the drive angle of the reciprocating pistons and the bevel angle of the stripper plate are approximately 5°.

9. The aerating machine of claim 1 wherein the spiking tines are arranged and distributed at high density on the base plate with the spacing between tines approximately 1 inch (2.5cm) on center or less.

10. A turf aerating machine having a plurality of reciprocating pistons each with a driving end and a free end, each piston being fitted at the free end with a turf aerating tool and a mounting yoke for mounting the turf aerating tool at the free end of the piston, said pistons being oriented for motor driven punching and aerification of turf in reciprocating cycles of the turf aerating tools during motion of the turf aerating machine in a forward direction of travel, said pistons being oriented at a drive angle with respect to the vertical direction, the driving end of each piston being tilted slightly forward of the free end of the piston in the forward direction of travel of the turf aeration machine thereby forming said driving angle during at least a portion of each reciprocating cycle to facilitate motion in the forward direction of travel, the improvement according to which each turf aerating tool is a turf spiking tool comprising:

a flat base plate with mounting means securing the base plate to the mounting yoke, said mounting yoke securing the base plate to the free end of a piston, and a plurality of spiking tines projecting from the base plate, said tines having tapered ends and a length sufficient to penetrate turf and make soil contact with soil underlying the turf, said tines being constructed for parting the turf and soil for receiving seeds with soil contact, said tines being arranged with sufficient density for reseeding a desired area of turf;

a stripper plate formed with a plurality of openings in alignment with the projecting tines of the base plate, said stripper plate being mounted and positioned adjacent to the base plate for sliding motion relative to the base plate with the tines of the base plate passing through the stripper plate openings, said stripper plate also being formed with at least two spaced apart guide bolts secured to the stripper plate and projecting in the direction of the adjacent base plate, said stripper plate being positioned for bearing against the ground during punching and aerating of turf in reciprocating cycles;

said base plate being formed with guide holes slideably receiving the stripper plate guide bolts for maintaining the stripper plate and base plate substantially in parallel alignment, each guide hole being formed with a bushing for slideably receiving the respective stripper plate guide bolt, said base plate guide hole bushings and respective stripper plate guide bolts being constructed with specified tolerance or clearance to accommodate compound angular rocking motion of the stripper plate relative to the base plate departing from parallel alignment in the angular range of approximately 3° to 5° relative to each other for achieving flat contact of the stripper plate with the turf during punching and aerification of turf in reciprocating cycles;

stripper spring means coupled between the base plate and stripper plate having a selected spring constant for restoring the stripper plate to a spaced apart position relative to the base plate after punching and aerating turf and for holding the turf in place under the stripper plate upon retraction of tines from the turf during said reciprocating cycles, said base plate being formed with a stripper spring first recess, said stripper spring means being seated in said first recess at a first end and abutting the stripper plate at a second end permitting close approach of the stripper plate and base plate in substantially abutting relationship during punching and aerification of turf without interference by the stripper spring means;

said stripper plate being formed with upper and lower surfaces at a bevel angle relative to each other providing a wedge shaped stripper plate, said stripper plate being mounted on the base plate with the upper surface of the stripper plate being substantially parallel with a lower surface of the base plate, said bevel angle of the stripper plate being substantially equal to the drive angle of the piston so that the bottom of the surface of the stripper plate contacting the turf is substantially parallel with the turf for flat engagement of the bottom surface of the stripper plate with the turf.

11. The turf aerating machine of claim 10 wherein the bevel angle of the stripper plate upper and lower surfaces is in the range of approximately 5°-10°.

12. The turf aerating machine of claim 11 wherein the bevel angle between the upper and lower surfaces of the stripper plate and the drive angle of the reciprocating pistons relative to the vertical direction are approximately 5°.

13. The turf aerating machine of claim 10 wherein the stripper plate is formed with a second stripper spring recess, said stripper spring means being seated in said second stripper spring recess at the second end.

14. A turf spiking tool attachment for retrofitting a turf aerating machine having a plurality of reciprocating pistons each with a driving end and a free end, said turf spiking tool attachment being mounted on the free end, said pistons being oriented for motor driven punching and aerification of turf in reciprocating cycles during motion of the turf aerating machine in a forward direction of travel, said pistons being oriented at a drive angle with respect to the vertical direction to facilitate motion in the forward direction of travel, said turf spiking tool attachment comprising:

a flat base plate with mounting means for securing the base plate to the free end of a piston, and a plurality of spiking tines projecting from the base plate, said tines having tapered ends and a length sufficient to penetrate turf and make soil contact with soil underlying the turf;

a stripper plate formed with a plurality of openings in alignment with the projecting tines of the base plate, said stripper plate being mounted and positioned adjacent to the base plate for sliding motion relative to the base plate with the tines of the base plate passing through the stripper plate openings, said stripper plate also being formed with guide means secured to the stripper plate and engaging the adjacent base plate for maintaining the stripper plate and base plate substantially in parallel alignment, said stripper plate being positioned for bearing against the turf during punching and aerification of turf;

stripper spring means coupled between the base plate and stripper plate having a selected spring constant for pushing the stripper plate against the turf and for returning the stripper plate to a spaced apart starting position relative to the base plate after punching and aerification of turf;

said stripper plate being formed with upper and lower surfaces at a bevel angle relative to each other, said stripper plate being mounted adjacent to the base plate with the upper surface of the stripper plate being substantially parallel with a lower surface of the respective base plate, said bevel angle of the stripper plate being substantially equal to the drive angle of the pistons so that the lower surface of the stripper plate contacting the turf is substantially parallel with the ground.

15. The turf spiking tool attachment of claim 14 wherein the guide means comprises at least two spaced apart guide bolts secured to the stripper plate and projecting in the direction of the adjacent base plate, said base plate being formed with guide holes slideably receiving the stripper plate guide bolts for maintaining the stripper plate and base plate substantially in parallel alignment without interference in punching and aerification of turf.

16. The turf spiking tool attachment of claim 15 wherein each guide hole is formed with a bushing for slideably receiving a respective guide bolt of the stripper plate, said base plate guide hole bushings and respective stripper plate guide bolts being constructed with specified tolerance or clearance to accommodate limited compound angular rocking motion of the stripper plate relative to the base plate during contact of the stripper plate with turf while punching and aerating the turf in reciprocating cycles and while the turf aerating machine is in motion in the forward direction of travel.

17. The turf spiking tool attachment of claim 16 wherein the base plate guide hole bushings and respective stripper plate guide bolts are constructed with specified tolerance to accommodate compound angular rocking motion of the stripper plate relative to the base plate departing from parallel alignment in the angular range of approximately 3° to 5° relative to each other.

18. The turf spiking tool attachment of claim 14 wherein the base plate is formed with a first stripper spring recess, said stripper spring means being seated in said recess at a first end and abutting the stripper plate at a second end, thereby permitting close approach of the stripper plate and base plate without interference by the stripper spring means.

19. The turf spiking tool attachment of claim 18 wherein the stripper plate is formed with a second stripper spring recess, said stripper spring means being seated in said second stripper spring recess at the second end, said first and second recesses providing a combined depth slightly less than the compressed length of the stripper spring.

20. The turf spiking tool attachment of claim 14 wherein the bevel angle between the upper and lower surfaces of the stripper plate is in the range of approximately 5° to 10°.

* * * * *